United States Patent [19]

Christiansen et al.

[11] Patent Number: 4,483,955
[45] Date of Patent: * Nov. 20, 1984

[54] HIGH GLOSS POLYETHYLENE TEREPHTHALATE REINFORCED RESIN COMPOSITIONS

[75] Inventors: John Christiansen, Edison; Shau-Zou Lu, Whitehouse Station, both of N.J.

[73] Assignee: Celanese Corporation, New York, N.Y.

[*] Notice: The portion of the term of this patent subsequent to Jan. 10, 2001 has been disclaimed.

[21] Appl. No.: 345,275

[22] Filed: Feb. 3, 1982

Related U.S. Application Data

[63] Continuation-in-part of Ser. No. 306,367, Sep. 25, 1981, Pat. No. 4,425,457, which is a continuation of Ser. No. 175,565, Aug. 6, 1980, abandoned.

[51] Int. Cl.$^3$ ............................................... C08K 7/14
[52] U.S. Cl. .............................. 524/293; 264/331.18; 264/328.17; 524/359; 524/377; 524/401; 524/424; 524/425; 524/426; 524/442
[58] Field of Search ............... 524/293, 359, 377, 401, 524/424, 425, 426, 442; 264/331.18

[56] References Cited

U.S. PATENT DOCUMENTS

| | | | |
|---|---|---|---|
| 3,230,184 | 1/1966 | Alford | 260/40 R |
| 3,328,339 | 6/1967 | Tierney | 260/40 R |
| 3,368,995 | 2/1968 | Furukawa et al. | 260/40 R |
| 3,487,041 | 12/1969 | Okuzumi | 260/40 R |
| 3,516,957 | 6/1970 | Gray et al. | 260/31.6 |
| 3,547,872 | 12/1970 | Weissermel et al. | 260/40 |
| 3,547,873 | 12/1970 | Weissermel et al. | 260/40 R |
| 3,565,852 | 2/1971 | Conix et al. | 260/40 |
| 3,575,931 | 4/1971 | Sherman | 260/31.6 |
| 3,578,623 | 5/1971 | Weissermel et al. | 260/40 |
| 3,595,818 | 7/1971 | Weissermel et al. | 260/31.8 |
| 3,624,841 | 11/1971 | Brandrup et al. | 260/75 M |
| 3,629,366 | 12/1971 | Brinkman | 260/860 |
| 3,654,234 | 4/1972 | Jeurissen | 528/283 |
| 3,673,139 | 6/1972 | Hrach | 260/22 R |
| 3,673,144 | 6/1972 | Weissermel et al. | 260/30.4 |
| 3,764,576 | 10/1973 | Russo | 260/40 R |
| 3,814,725 | 6/1974 | Zimmerman et al. | 260/40 R |
| 3,821,156 | 6/1974 | Farran | 260/40 R |
| 3,859,246 | 1/1975 | Jackson et al. | 260/40 R |
| 3,889,039 | 6/1975 | Wainer | 428/404 |
| 3,953,394 | 4/1976 | Fox | 260/40 R |
| 3,965,064 | 6/1976 | Mercier et al. | 260/30.6 |
| 4,016,112 | 4/1977 | Kajiura et al. | 260/2.5 N |
| 4,028,289 | 6/1977 | Brown | 260/2.5 N |
| 4,086,212 | 4/1978 | Bier et al. | 260/75 |
| 4,102,853 | 7/1978 | Kawamura et al. | 260/40 R |
| 4,122,047 | 10/1978 | Filip et al. | 521/106 |
| 4,172,824 | 10/1979 | Harrington et al. | 260/31.2 |
| 4,212,791 | 7/1980 | Avery et al. | 260/40 |
| 4,220,735 | 9/1980 | Dieck et al. | 260/37 |
| 4,351,758 | 9/1982 | Lu et al. | 524/424 |
| 4,385,144 | 5/1983 | Jones et al. | 524/114 |

FOREIGN PATENT DOCUMENTS

| | | |
|---|---|---|
| 3000855 | 7/1980 | Fed. Rep. of Germany . |
| 1104089 | 2/1968 | United Kingdom . |
| 2015014 | 9/1979 | United Kingdom . |

*Primary Examiner*—Veronica P. Hoke
*Attorney, Agent, or Firm*—Burns, Doane, Swecker & Mathis

[57] ABSTRACT

Polyethylene terephthalate resin compositions are provided containing fillers; reinforcing agents; or blends of such fillers and agents; alkali metal silicates, carbonates, or bicarbonates; and neopentylglycol dibenzoate.

Articles molded from these compositions have high gloss surfaces and heat deflection temperatures when molded at temperatures below 110° C. even without a precompounding drying stage.

Surprisingly, the inclusion of neopentylglycol dibenzoate allows the concentration of alkali metal silicate, carbonate, or bicarbonate to be substantially reduced while retaining the high gloss surfaces seen when alkali metal silicates, carbonates, or bicarbonates are used alone at much higher concentrations.

10 Claims, No Drawings

HIGH GLOSS POLYETHYLENE TEREPHTHALATE REINFORCED RESIN COMPOSITIONS

This is a continuation-in-part of application Ser. No. 306,367, filed Sept. 25, 1981, now U.S. Pat. No. 4,425,457, which is a continuation of application Ser. No. 175,565, filed Aug. 6, 1980, now abandoned.

This invention relates to polyethylene terephthalate resins useful in molding applications. More particularly this invention relates to polyethylene terephthalate resins containing an inorganic reinforcing or filler material.

BACKGROUND OF THE INVENTION

It is desirable to enhance the strength of articles molded from polyethylene terephthalate resin by employing a reinforcing material, such as glass fibers, asbestos fibers or other fibrous mineral materials, preferably with a coupling agent, in the resin. Furthermore, it is sometimes sufficient to merely increase the modulus by use of a filler, such as beads or a mineral of low aspect ratio, in the resin. However, heretofore it was necessary to use very high mold temperatures, on the order of 130° C. to obtain molded articles from such reinforced or filled resins which had a glossy surface and which were not rough in texture. If these high mold temperatures were not employed, the molded articles had a rough surface with poor gloss. It is believed that below about 130° C., the crystallization rate of polyethylene terephthalate is too slow to result in a molded article having good surface characteristics.

While good surface characteristics can be obtained at molding temperatures of 130° C. or more, the use of such temperatures is not practical in the molding field, for most molds are heated with water and attain temperatures of only about 85°–110° C.

A few molding devices employ heating means such as oil to reach temperatures higher than 85°–110° C. but these generally are inconvenient to use and still either do not generally reach such temperatures or reach them unevenly because of inadequate coring. Because of these heating problems, it has proven commercially unattractive to employ these high temperature molding devices with reinforced or filled polyethylene terephthalate resins.

To increase the speed of crystallization of the injection molded polyethylene terephthalate in the mold, it has been proposed at various times to add to the resin finely divided inorganic substances as nucleating agents. By this step the crystallinity and the density of the injection molded articles are increased and therewith the dimensional stability and stability of shape at elevated temperatures are improved. As solid inorganic substances there have been proposed, for example, metal oxides, alkaline earth metal salts, talc powder, glass powder or metals. It has likewise been proposed to increase the speed of crystallization by adding to the resin a mixture of inorganic nucleating agents with specific epoxides. In all of these cases it has been said to be desirable that the inorganic substances should have a particle size of less than two microns if possible.

In all of the above situations, even when filled polyethylene terephthalate resin has been molded at temperatures above 110° C., it has been found that it is necessary, in order to obtain unobjectionable injection molded articles, that the polyester molding composition should contain as little moisture as possible, the art suggesting that such compositions should contain preferably less than 0.02% by weight of water.

In addition to the above-described problems, it has been found that many of the nucleating agents taught as useful in the prior art do not achieve the normally high heat deflection temperature expected of molded polyethylene terephthalate.

SUMMARY OF THE INVENTION

The instant invention provides a reinforced and/or filled polyethylene terephthalate resin composition that can be molded at mold temperatures below about 110° C. without a predrying stage prior to compounding to produce a molded article having a smooth and glossy surface and at the same time sustaining high heat deflection temperature levels. The reinforced and/or filled polyethylene terephthalate resins of this invention achieve the foregoing properties by having incorporated therein alkali metal silicates, carbonates or bicarbonates; and neopentylglycol dibenzoate.

Surprisingly, the inclusion of neopentylglycol dibenzoate allows the concentration of alkali metal silicate, carbonate, or bicarbonate to be substantially reduced while retaining the high gloss surfaces seen when alkali metal silicates, carbonates, or bicarbonates are used alone at much higher concentrations.

According to this invention there are provided thermoplastic compositions comprising in combination:
a. from about 40 to about 95% by weight of a polyethylene terephthalate resin;
b. from about 4 to about 65% by weight of a substance selected from the group consisting of a reinforcing agent; a filler material; and a blend of reinforcing agent and filler material;
c. from about 0.2 to 0.5% by weight of an alkali metal silicate, carbonate, or bicarbonate; and
d. from about 1.5 to 5.0% by weight of neopentylglycol dibenzoate.

A preferred feature of this invention is to provide glass filled thermoplastic compositions wherein the reinforcing agent is glass fiber reinforcing filler.

According to another preferred feature of this invention, there are provided reinforced flame retardant thermoplastic compositions comprising:
a. from about 40 to about 95% by weight of a polyethylene terephthalate resin;
b. from about 4 to about 65% by weight of glass fiber;
c. from about 0.2 to 0.5% by weight of an alkali metal silicate, carbonate or bicarbonate;
d. from about 1.5 to 5% by weight of neopentylglycol dibenzoate; and
e. a flame retardant additive in a minor proportion but in an amount at least sufficient to render the resinous combination non-burning or self-extinguishing.

DETAILED DESCRIPTION OF THE INVENTION

Polyethylene terephthalate resins are disclosed in Whinfield et al, U.S. Pat. No. 2,465,319. Such polymeric linear terephthalic esters are composed of recurring structural units of the formula

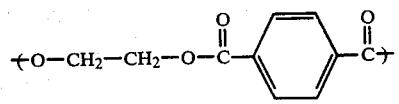

Such polymers will have molecular weights high enough to have melting points above 200° C. Polyethylene terephthalate resins can be made following the teachings of the Whinfield et al patent and U.S. Pat. No. 3,047,539 to Pengilly, which are incorporated herein by reference.

Other suitable polyesters are, for example, polycyclohexane-1,4-dimethylol terephthalate or polyesters containing as acid component, in addition to terephthalic acid, up to 5 mole percent of other aromatic or aliphatic dicarboxylic acids, such as isophthalic acid, naphthalene-2,6-dicarboxylic acid or adipic acid, or as alcoholic component, in addition to ethylene glycol, up to 30 mole percent of other aliphatic diols, such as 2,2-dimethylpropane-diol-1,3 or butane-diol-(1,4), or up to 1% of tetrols, for example, 1,1,4,4-tetramethylolcyclohexane. These can also be made following the teachings of the above-mentioned Pengilly and Whinfield patents suitably modified if necessary. Polyesters of hydroxy carboxylic acids may also be used.

The polyesters should have an intrinsic viscosity of at least 0.2 and preferably about at least 0.4 deciliter/gram as measured from the relative viscosity of an 8% solution in orthochlorophenol at 25° C.–30° C. The upper limit is not critical but it will generally be about 2.5 deciliter/gram. Especially preferred polyesters will have an intrinsic viscosity in the range of about 0.4 to 1.3 deciliter/gram.

As has been mentioned, the preferred class of compositions will comprise the polyethylene terephthalate resin and a reinforcing amount of a reinforcing filler.

The polyethylene resin can be present in an amount from about 40 to about 95% by weight, preferably from about 45 to 90% by weight and most preferably from about 50 to 85% by weight.

In general, any reinforcement can be used, for example, fibers, whiskers or platelets of metals, i.e., aluminum, iron or nickel and the like, and non-metals, i.e., ceramics, carbon filament silicates, asbestos, titanium dioxide and titanate whiskers, quartz, glass flakes and fibers and the like.

In particular, the preferred reinforcing filler is glass, and it is preferred to use fibrous glass filaments comprised of lime-aluminum borosilicate glass that is relatively soda free. This is known as "E" glass. However, other glasses are useful where electrical properties are not so important, for example, the low soda glass known as "C" glass. The filaments are made by standard processes, e.g., by steam or air flowing, flame blowing and mechanical pulling. The preferred filaments for plastics reinforcement are made by mechanical pulling. The filament diameters range from about 0.00012 to about 0.00075 inch, but this is not critical to the present invention.

The length of the glass filaments, and whether or not they are bundled into fibers and the fibers bundled in turn to yarns, ropes or rovings or woven into matts and the like, are not critical to the invention. However, in preparing the present compositions, it is convenient to use the filamentous glass in the form of chopped strands of from about ⅛ to about 1 inch long, preferably less than ¼ inch long. In articles molded from the compositions, on the other hand, even shorter lengths will be encountered because considerable fragmentation will occur during compounding. This is desirable, however, because the best properties are exhibited by thermoplastic injection molded articles in which the filament lengths lie between about 0.000005 inch and 0.125 (⅛) inch. In general, the best properties will be obtained if the sized filamentous glass reinforcement comprises from about 4 to about 65% by weight, based on the combined weight of the glass, polyester and additives and preferably from about 10 to 55% by weight. Most preferably the glass will comprise from about 25 to 45% by weight, based on the combined weight of the glass resin and additives. Generally, for direct molding use, up to about 65% by weight of glass can be present without causing flow problems.

The nucleating agents of the instant invention are monovalent metal salts, i.e., alkali metal salts with selected inorganic anions which are described below. In other words, the metal cations of the inorganic nucleating salts of the present invention are selected from the group consisting of lithium, sodium, potassium, rubidium, and cesium; with the preferred metal cations being lithium, sodium and potassium, the most preferred being sodium.

The anions of the inorganic nucleating agents of the instant invention are silicate, carbonate or bicarbonate anions.

The nucleating agents are present in the resin composition in an amount from about 0.2 to 0.5% by weight, based on the total weight.

Although the addition of neopentylglycol dibenzoate has very little effect on heat distortion temperatures of the molded articles, it has been found to enhance the gloss values of the already smooth surfaces achieved with the nucleating agents of the instant invention. Furthermore, the use of neopentylglycol dibenzoate permits the nucleating agents of this invention to be effective at lower levels. The neopentylglycol dibenzoate should be present in an amount from about 1.5 to 5.0% by weight based on the total weight of the composition.

It is a preferred feature of this invention also to provide flame retardant compositions because polyethylene terephthalate is normally flammable. Therefore, the composition can also include a flame retardant additive in a minor proportion but in an amount at least sufficient to render the polyester resin non-burning or self-extinguishing.

Non-dripping embodiments are provided if the flame retardant compositions also include a polytetrafluoroethylene resin or a fumed colloidal silica in a minor proportion based on the composition, but in an amount at least sufficient to render said polyester resin non-dripping, when burning.

Definitions of the terms "non-burning", "self-extinguishing" and "non-dripping" as well as descriptions of the standard tests utilized to measure these properties and flame retardant additives are well known in the art and discussed in detail in Fox et al, U.S. Pat. No. 3,953,394, whose disclosure is incorporated herein by reference.

The compositions of the instant invention can also contain mold release agents such as Acrawax C (N,N',-distearoyl ethylenediamine) in an amount from about 0.05 to about 10% by weight, based on the total weight of the composition.

The filler material and other additives, such as foaming agents, can be added in any usual manner such as, for example, by dry mixing or by mixing in the melted state in an extruder, on a heated mill or in other mixers.

By way of illustration, glass roving (a bundle of strands of filaments) is chopped into small pieces, for example, ⅛ inch to 1 inch in length and preferably less than ¼ inch in length and put into an extrusion compounder with the polyester resin, the nucleating agent, the flame retardant additive(s), if used, and also if used the polytetrafluoroethylene or fumed colloidal silica to produce molding pellets. The fibers are shortened and predispersed in the process, coming out at less than 1/16 inch long. In another procedure, glass filaments are ground or milled to short lengths and are mixed with the resin, nucleating agent, flame retardant additive and polytetrafluoroethylene resin or fumed colloidal silica by dry blending then either fluxed in a mill or ground. Alternatively, the glass filaments are extruded and chopped. In still another procedure, continuous lengths of glass roving are drawn through a bath of melted polyester resins, and nucleating agents and optionally the flame retardant additive(s) and polytetrafluoroethylene resin or fumed colloidal silica, which procedure coats the filaments. The resin-coated glass strand is then comminuted into pellets to form a molding compound. The glass fibers can also be mixed with resin, nucleating agent and additives and indirectly molded, for example, by injection or transfer molding techniques.

Compounding should be carried out to insure that the residence time in the machine is short, the temperature is carefully controlled, and an intimate blend between the resin and additives is obtained.

Although it is not essential, best results are obtained if the ingredients are precompounded, pelletized and then molded. Precompounding can be carried out in conventional equipment. For example, a single screw extruder is fed a dry blend of the ingredients, the screw employed having a long transition section to insure proper melting. On the other hand, a twin screw extrusion machine, for example, a 28 millimeter Werner Pfleiderer machine can be fed resin and additives at the feedport and reinforcement filaments downstream. In either case a generally suitable machine temperature will be about 500° to 580° F.

The precompounded composition can be extruded and cut up into molding compounds, such as conventional granules, pellets, etc. by standard techniques. The compositions can be molded in any equipment conventionally used for reinforced thermoplastic compositions. For example, good results will be obtained in an injection molding machine, e.g., of the Newbury type with conventional cylinder temperatures, e.g., 510° F. and mold temperatures, e.g., from about 150° F. to about 230° F. at cycle times from about 20 seconds to about 60 seconds. If necessary, depending on the molding properties of the polymer, the amount of reinforcing filler and the rate of crystallization of the polyester are determined by the type and amount of nucleating agent utilized. Those skilled in the art will be able to make the conventional adjustments and design molding cycles to accommodate the composition.

DESCRIPTION OF THE PREFERRED EMBODIMENTS

The following examples illustrate the invention. They are set forth as a further description, but are not to be construed as limiting the invention.

The gloss test used in the following examples is an adaptation of ASTM D-2457 with any results below 15 being undesirable. A gloss value of 20 or above is preferred and considered to be a high gloss value. This test, which was designed for use on plastic film, is conducted at a 45° angle substituting a molded plaque in place of the film sample.

COMPARATIVE EXAMPLES 1-4

The following blends of polyethylene terephthalate (PET), glass and the nucleating agents, calcium carbonate, talc, sodium bicarbonate and sodium carbonate are individually precompounded at 510° F. (barrel temperature) by passing them through a 2½" Johnson single screw extruder. This PET has a water content of from about 0.58 to about 0.68%. Half of the material is carefully predried at 300° F. for approximately 12 hours prior to being fed to the extruder. The moisture content of the predried material is approximately 0.01% by weight. The calcium carbonate has an average particle size of about 0.07 microns and the talc has an average particle size of about 2.7 microns.

The extrudate from the extruder is pelletized and the pellets are injection molded at 110°, 90° and 70° C. (see Table 1) into ASTM type test bars in a 5 oz. Reed injection molding machine.

The heat deflection temperature data is according to ASTM D-648 at 264 psi. A heat deflection temperature of 220° C. or higher is considered acceptable for purposes of the present invention.

TABLE 1

| COMPOSITION | | | | |
|---|---|---|---|---|
| PET | 68.3% | 68.3% | 68.3% | 68.3% |
| Glass | 31% | 31% | 31% | 31% |
| Nucleant | 0.7% | 0.7% | 0.7% | 0.7% |
| | $CaCO_3$ | Talc | $NaHCO_3$ | $Na_2CO_3$ |

Resin Moisture Content - Heat Deflection Temperature Values at 264 psi

| (1) PET = app. 0.01% (dry) Mold Temperature | | | | |
|---|---|---|---|---|
| 110° C. | 98 | 222 | 231 | 224 |
| 90° C. | 83 | 217 | 230 | 225 |
| 70° C. | 78 | 196 | 223 | 224 |
| (2) PET = 0.58 to 0.68% (wet) Mold Temperature | | | | |
| 110° C. | 214 | 214 | 230 | — |
| 90° C. | 84 | 203 | 227 | — |
| 70° C. | 78 | 105 | 222 | — |

TABLE 2

| COMPOSITION | | | | |
|---|---|---|---|---|
| PET | 68.3% | 68.3% | 68.3% | 68.3% |
| Glass | 31% | 31% | 31% | 31% |
| Nucleant | 0.7% | 0.7% | 0.7% | 0.7% |
| | $CaCO_3$ | Talc | $NaHCO_3$ | $Na_2CO_3$ |

Resin Moisture Content - Gloss Values

| (1) PET = app. 0.01% (dry) Mold Temperature | | | | |
|---|---|---|---|---|
| 110° C. | <15 | <15 | 32 | 51 |
| 90° C. | <15 | <15 | 18 | 30 |
| 70° C. | <15 | <15 | <15 | 23 |
| (2) PET = 0.58 to 0.68% (wet) Mold Temperature | | | | |
| 110° C. | <15 | <15 | 46 | — |
| 90° C. | <15 | <15 | <15 | — |
| 70° C. | <15 | <15 | 17 | — |

In the above examples, it is seen that molding compositions utilizing calcium carbonate or talc as nucleating agents, have unacceptably low heat deflection temperatures when the mold temperatures for both wet and dry resin are below 110° C. The nucleating agents of the instant invention, as typified by our preferred nucleating agents of sodium bicarbonate and sodium carbonate, on the other hand, even with wet (i.e., non-dried, precompounded resin) polyethylene terephthalate resin, can be molded below 110° C., even as low as 70° C., and still sustain high heat deflection temperatures, i.e., above 220° C.

Furthermore, examination of the gloss values show them to be totally unacceptable when standard agents such as calcium carbonate and talc are employed. This is the case even at a mold temperature of 110° C., even when the polyethylene terephthalate resin had been predried to below 0.01% moisture. In startling contrast, the results with sodium bicarbonate and sodium carbonate show that high gloss is attained at 110° C. and below, and in the case of the sodium bicarbonate, high gloss values are obtainable at about 110° C. even though the resin had not been predried prior to compounding.

EXAMPLES 5-15

All of the following examples are prepared in accordance with the procedures followed in Examples 1-4 and all of the formulations contain about 65.6% polyethylene terephthalate, 31% glass, 0.2% Acrawax C and 3% of neopentylglycol dibenzoate as a plasticizer, with the exception of Example 12 which contains no plasticizer.

| EXAMPLE NOS. | NUCLEANTS | GLOSS VALUES |
| --- | --- | --- |
| 5 | 0.2% $Na_2CO_3$ | 42 |
| 6 | 0.2% $K_2CO_3$ | 35 |
| 7 | 0.2% $Li_2CO_3$ | 23 |
| 8 | 0.2% $(NH_4)_2HPO_4$ | 17 |
| 9 | 0.2% $Na_2HPO_4.12H_2O$ | 17 |
| 10 | 0.2% $MgSO_4.7H_2O$ | 12 |
| 11 | 0.2% NaCl | 12 |
| 12 | 0.2% $Na_2CO_3$ | 16 |
| 13 | 0.4% $NaHCO_3$ | 56 |
| 14 | 0.4% $Na_2SiO_3$ | 47 |
| 15 | 0.4% $Na_2SO_4$ | 16 |

These compositions were all molded with a mold temperature of 100° C. and the compositions dried prior to extruding.

From the above examples one can see that the gloss values of molded articles employing nucleating agents other than those of this invention (Examples 8-11 and 15), even with the use of a neopentylglycol benzoate, are totally unacceptable or at least fall outside the preferred range. This is in sharp contrast to the extremely high gloss values realized when the nucleating agents of the present invention are combined with neopentylglycol dibenzoate as shown in Examples 5, 6, 7, 13 and 14.

Furthermore, a comparison of the gloss value result of Example 5 which utilizes a 0.2% loading of $Na_2CO_3$ with neopentylglycol dibenzoate present, versus the gloss value result of Example 12 which utilizes a 0.2% loading of $Na_2CO_3$ without a plasticizer, illustrates the surprising enhancement of the effectiveness of the nucleating agent realized by the addition of neopentylglycol dibenzoate.

Obviously, other modifications and variations of the present invention are possible in the light of the above teachings. It is therefore to be understood that changes may be made in the particular embodiments of this invention described which are within the full intended scope of the invention as defined by the appended claims.

What is claimed is:

1. A reinforced polyethylene terephthalate molding resin composition suitable for use in preparing molded reinforced polyethylene terephthalate articles having gloss values of at least about 15 and heat distortion temperatures of at least about 200° C. at molding temperatures of from about 70° to about 110° C., consisting essentially of:
    (a) from about 40 to about 95% by weight of polyethylene terephthalate having an inherent viscosity of at least 0.4;
    (b) from about 4 to about 65% by weight of a substance selected from the group consisting of a reinforcing agent; a filler material; and a blend of a reinforcing agent and filler material;
    (c) from about 0.2 to about 0.5% by weight of an alkali metal salt having an anion which is silicate, carbonate, or bicarbonate; and
    (d) from about 0.5 to about 5.0% by weight of neopentylglycol dibenzoate.

2. The composition of claim 1 wherein the reinforcing material is glass fiber.

3. The composition of claim 1 wherein the alkali metal salt cation is selected from the group consisting of lithium, sodium and potassium.

4. The composition of claim 1 wherein the alkali metal salt cation is sodium.

5. The composition of claim 1 wherein the alkali metal salt is selected from the group consisting of sodium bicarbonate and sodium carbonate.

6. The composition of claim 1 wherein the neopentylglycol concentration is about 3.0% by weight.

7. The composition of claim 1 comprising in addition a flame retardant additive in a minor proportion but in an amount at least sufficient to render the composition non-burning or self-extinguishing.

8. The flame retarded composition of claim 7 whereby said resinous combination is non-dripping when burning.

9. A method of producing high gloss, molded, reinforced polyethylene terephthalate articles having gloss values of at least about 15 and a heat distortion temperature of at least about 200° C., which uses molding temperatures of 110° C. or less, which comprises:
    (1) employing a polyethylene terephthalate resin composition consisting essentially of:
        (a) from about 40 to about 95% by weight of polyethylene terephthalate having an inherent viscosity of at least 0.4;
        (b) from about 4 to about 65% by weight of a substance selected from the group consisting of a reinforcing agent; a filler material; and a blend of a reinforcing agent and filler material;
        (c) from about 0.2 to about 0.5% by weight of an alkali metal salt having an anion which is silicate, carbonate, or bicarbonate; and
        (d) from about 1.5 to about 5.0% by weight of neopentylglycol dibenzoate;
    (2) molding said resin composition at a temperature between about 70° and about 110° C.

10. The method of claim 9 wherein the resin composition is dried prior to being compounded and prior to being molded.

* * * * *